United States Patent [19]

Zimmermann

[11] Patent Number: 4,690,507

[45] Date of Patent: Sep. 1, 1987

[54] MOUNTING SYSTEMS FOR OBJECTS AND OPTICAL COMPONENTS

[75] Inventor: Micha Zimmermann, Haifa, Israel

[73] Assignee: Newport Corporation, Fountain Valley, Calif.

[21] Appl. No.: 774,029

[22] Filed: Sep. 9, 1985

[51] Int. Cl.⁴ .......................... G02B 27/02; G02B 7/02
[52] U.S. Cl. .................................... 350/321; 350/247; 248/562
[58] Field of Search ............... 350/321, 254, 522, 529, 350/257, 536, 632, 626, 638, 639, 235, 247; 248/499, 500, 562, 583, 612

[56] References Cited

U.S. PATENT DOCUMENTS

| | | |
|---|---|---|
| 1,784,382 | 12/1930 | Ousdal . |
| 3,101,230 | 8/1963 | Bausch et al. ........................ 248/500 |
| 3,357,268 | 12/1967 | Richter . |
| 3,652,152 | 3/1972 | Thursby, Jr. . |
| 3,698,798 | 10/1972 | Bolton ................................. 350/639 |
| 3,784,146 | 1/1974 | Matthews . |
| 3,799,567 | 3/1974 | Toda . |
| 3,936,156 | 2/1976 | Shaw et al. . |
| 4,066,330 | 1/1978 | Jones ................................... 350/257 |
| 4,076,391 | 2/1978 | Teiser et al. . |
| 4,120,564 | 10/1978 | Rios . |
| 4,120,586 | 10/1978 | Lessner . |
| 4,339,104 | 7/1982 | Weidman . |
| 4,408,830 | 10/1983 | Wutherich . |

OTHER PUBLICATIONS

Newport Corporation—1983-84 Catalog, pp. 1-26.

Primary Examiner—John K. Corbin
Assistant Examiner—Loha Ben
Attorney, Agent, or Firm—Benoit Law Corporation

[57] ABSTRACT

The disclosed mounting system is capable of fixing a base for mounting an optical component or other object anywhere on the surface of an optical table or other support having a two-dimensional pattern of mutually spaced fastener mounting holes. Such base includes two complementary base parts rotatable relative to each other. One of these base parts is provided with a radial or at least partially eccentric aperture for receiving a bolt or other fastener insertable into any one of the mounting holes. Such fastener is inserted through the base part aperture into one of the mounting holes, and the base may be shifted relative to that fastener to any one of a multitude of positions about that one mounting hole. If the above mentioned aperture is provided as herein preferred, the base may be positioned or fixed anywhere on the surface, even though the above mentioned mounting holes are mutually spaced from each other. Either one or both base parts may be attached to the surface by tightening the inserted fasteners. The two base parts may be rotated relative to each other as needed for orienting the object or optical component which is preferably mounted with the aid of a superstructure on the base part not having the above mentioned aperture.

33 Claims, 5 Drawing Figures

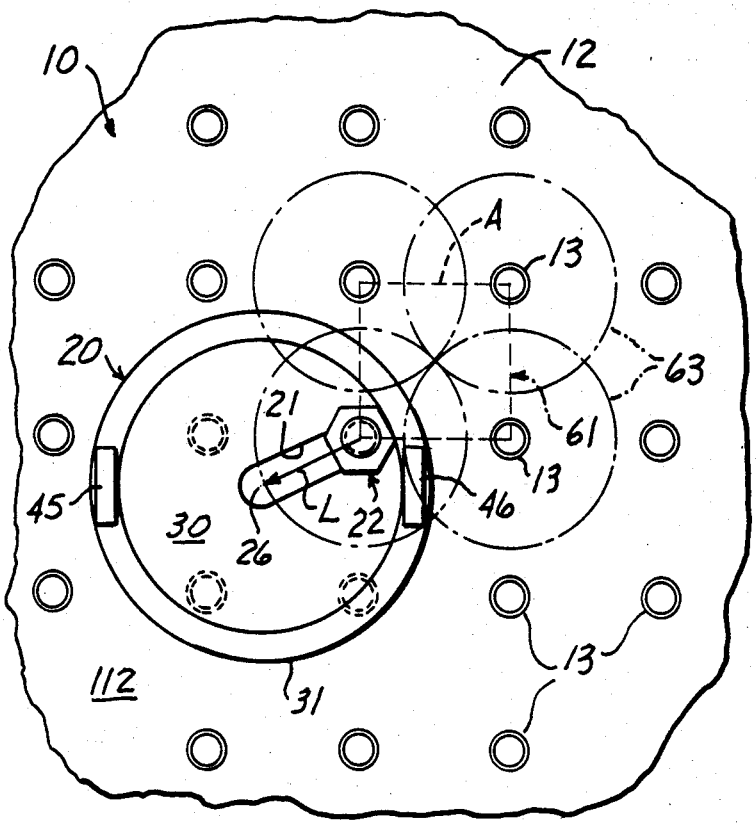
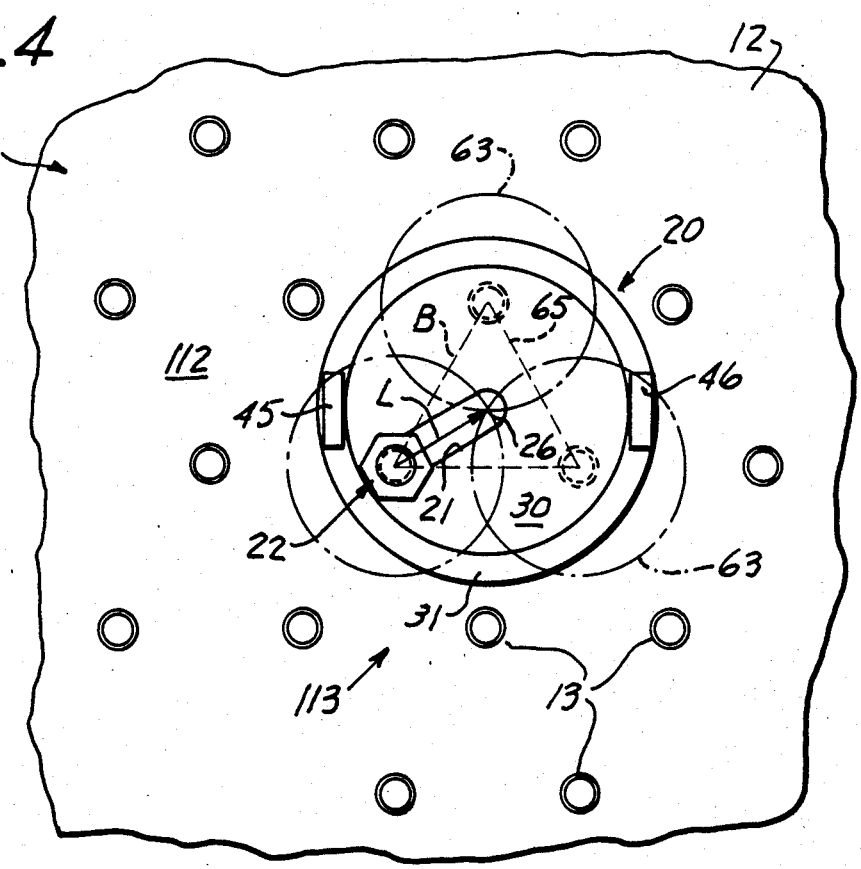

MOUNTING SYSTEMS FOR OBJECTS AND OPTICAL COMPONENTS

BACKGROUND OF THE INVENTION

1. Field of the Invention

The subject invention relates to mounting systems for fixing a base on a surface having a two-dimensional pattern of mutually spaced mounting holes for receiving a fastener and, more specifically, relates to optical or honeycomb panels and tables, to systems for mounting optical and other components thereon, and to mounts for optical components and other objects.

2. Information Disclosure Statement

This information disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Utility and advantages of honeycomb structures, panels and tables in various fields of technology are well known, as may, for instance, be seen from U.S. Pat. No. 3,784,146, by John W. Matthews, Ph.D., issued Jan. 8, 1974 and disclosing horizontal vibration isolation systems.

For an extensive tutorial discussion on optical honeycomb tables, reference may be had to the 1983-1984 Catalog by the subject assignee, Newport Corporation, pp. 3 et seq.

In this respect, by way of example and not by way of limitation, among the most sensitive applications to which optical tables are put are those involving interferometry, where tolerable relative displacements of reflective elements are measured in fractions of a micron and allowable table top bending or twisting is typically much less than a second of arc.

The rigidity of a panel or table used in optical research is one of the primary performance features and, for a given panel thickness and skin, depends largely on the shear modulus of the core. For these and related reasons, honeycomb cores are greatly preferred for very stable panel and table systems.

In the past, granite plates and slabs were frequently used in laser holography and interferometry work. However, while granite offers great stability, the great weight of granite slabs, and, above all, the need of threaded inserts in the slabs for securing components to granite surfaces, is increasingly displacing them from laboratories and similar environments. By contrast, a major advantage of honeycomb panels or tables is that their top skin or table leaf can be provided with tapped or threaded mounting holes for rigid attachment of components and component mounts on the table. If such mounting holes are present in a reasonable number, they only have a very minor effect on panel or table rigidity and strength.

However, even the provision of hundreds, or with larger tables, thousands of mounting holes in a grid pattern did not heretofore enable the user of the table to attach components or component mounts in an infinite number of positions on the optical table. In that respect, the mounting hole system has thus been inferior to the magnetic attraction system, in which component mounts are provided with magnets for an attachment thereof to the table in an infinite number of possible positions.

Of course, the magnetic mounting system restricts the choice of materials for the table leaf to those which are ferromagnetic. Considerations of cleanliness and thermal stability then narrow the choice typically to ferromagnetic stainless steel and Invar alloys. By contrast, less expensive non-magnetic stainless steel or aluminum may be employed, if attachment can be by way of mounting holes, rather than by magnetic attraction.

Another drawback of magnetic mounts is that their holding force with typical table materials decreases rapidly with decreasing thickness of the ferromagnetic table leaf, if such thickness is lower than three millimeters. Also, the more effective magnetic bases are bulkier than mechanical mounting bases. Moreover, magnetic attraction mounting systems should, of course, not be used where magnetism would affect an experiment, test or other setup.

An alternative, mounting by vacuum attraction, is frequently not attractive where the attraction will not hold over a longer period of time.

Mounts with wheeled bases are unsuitable for present purposes, as may, for instance, be seen from U.S. Pat. No. 1,784,382, by A. P. Ousdal, issued Dec. 9, 1930, for apparatus for utilizing solar radiations for therapeutic purposes, and U.S. Pat. No. 3,799,567, by Tokuzo Toda, issued Mar. 26, 1974. Mounts which simply stand on the table do not provide the frequently necessary rigidity and preservation of spatial relationship maintenance required among mounted optical components and their rigid table structure. This applies, for instance, to the mounting systems disclosed in U.S. Pat. No. 3,357,268, by T. L. Richter, issued Dec. 12, 1967, U.S. Pat. No. 4,120,564, by R. Rios, issued Oct. 17, 1978, and U.S. Pat. No. 4,339,104, by M. V. Weidman, issued July 13, 1982, and showing collectively various optical cell, lens and mirror stands.

Mounting clamps and clamping systems of the type disclosed in U.S. Pat. No. 3,652,152, by W. R. Thursby, issued Mar. 28, 1972, for an adjustable optical equipment holder, U.S. Pat. No. 3,936,156, by J. Shaw et al, issued Feb. 3, 1976 and showing various lens mounts, and U.S. Pat. 4,076,391, by S. Teiser, issued Feb. 28, 1978, are not practical or, in the main, are not even feasible in applications of the type herein under consideration.

Yet in research and development work, it is frequently important that optical and other components be positionable relative to each other in infinite variations of relative distances and positions.

SUMMARY OF THE INVENTION

It is a general object of this invention to overcome the disadvantages and to meet the needs expressed or implicit in the above Information Disclosure Statement or in other parts hereof.

It is a germane object of this invention to provide improved mounting systems.

It is a related object of this invention to enable positioning and fixing of a base for mounting an object with a fastener anywhere on a surface, even though that surface has a two-dimensional pattern of mounting holes which are mutually spaced from each other.

It is also an object of this invention to enable minimization of the dimensions of bases with which optical components and other objects are mounted on a surface which has a two-dimensional pattern of mutually spaced mounting holes.

It is a related object of this invention to provide improved mounting methods and apparatus for optical components.

It is also an object of this invention to augment the utility of optical tables and similar structures.

It is a further object of this invention to provide an improved mounting hole pattern on optical panels or tables and other supporting structures.

Other objects of the invention will become apparent in the further course of this disclosure.

From one aspect thereof, the subject invention resides in a method of fixing a base for mounting an object on a surface having a two-dimensional pattern of mutually spaced mounting holes and, more specifically, resides in the improvement comprising, in combination, the steps of composing the base of two complementary base parts rotatable relative to each other, providing one of the base parts with an at least partially eccentric aperture for receiving a fastener insertable into any one of the mounting holes, placing the base on said surface, inserting the fastener through the aperture into one of the mounting holes, shifting the base relative to the fastener to any one of a multitude of positions about the mounting hole, and attaching the base to the said surface with the fastener, the object being mounted on the other base part, and the base parts being rotated relative to each other as needed for orienting the object above said surface.

From a related object thereof, the subject invention resides in apparatus for fixing a base for mounting an object on a surface having a two-dimensional pattern of mutually spaced mounting holes for receiving a fastener in any one of such mounting holes and, more specifically, resides in the improvement comprising, in combination, two complementary base parts in the base rotatable relative to each other, one of the base parts having an at least partially eccentric aperture for loosely receiving the fastener prior to attachment of the base to said surface with the fastener in the mounting hole, and means for mounting the object on the other of the base parts.

From a further related object thereof, the subject invention resides in apparatus for mounting an object on a surface with a fastener and, more specifically, resides in the improvement comprising a supporting structure having said surface, and mounting holes in the supporting structure and surface for receiving the fastener, the mounting holes being present in the supporting structure and surface in a two-dimensional pattern in which adjacent mounting holes are located on the corners of an equilateral triangle.

Other objects of the invention will become apparent in the further course of this disclosure, and no restriction whatever is intended by this Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts and in which:

FIG. 3 is a top view of part of FIG. 1 on a somewhat enlarged scale, showing a modification according to an embodiment of the subject invention;

FIG. 4 is a top view similar to FIG. 3, but showing another modification and also an improved mounting hole pattern according to a further preferred embodiment of the subject invention.

DESCRIPTION OF PREFERRED EMBODIMENTS

Figure 1:
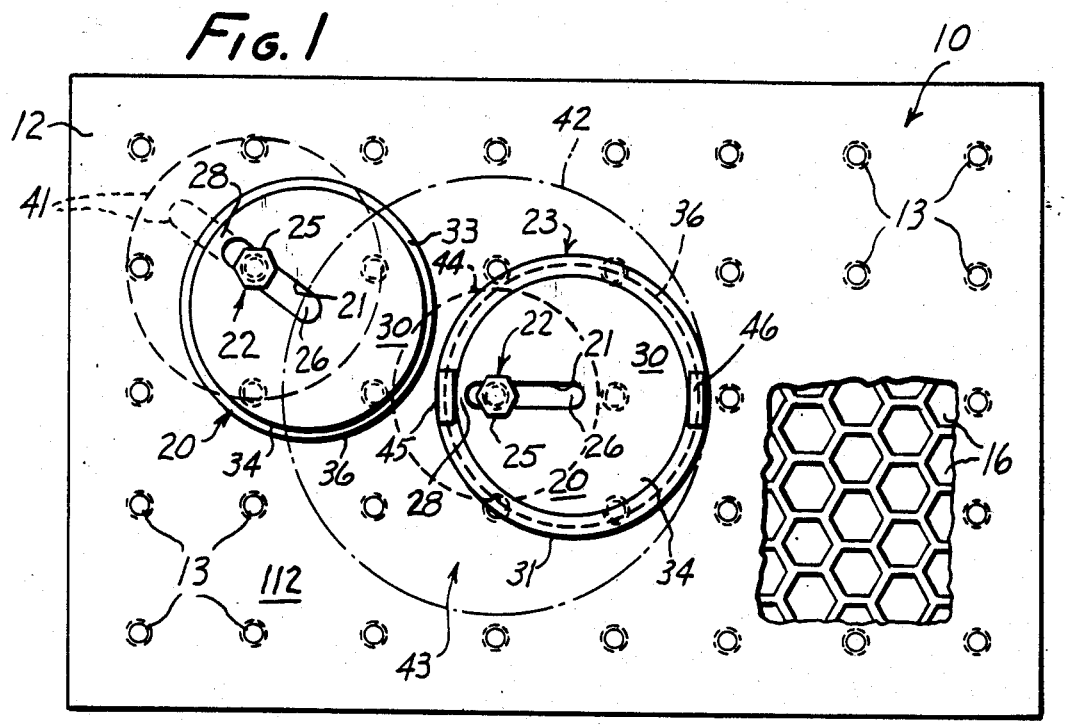
FIG. 1 is a top view of a honeycomb-type optical table and two mounting structures thereon according to a preferred embodiment of the subject invention.

The honeycomb table 10 whose top view is shown in FIG. 1 has a top skin or leaf 12, herein for brevity referred to as "table leaf." The structure 10 is illustrative of various honeycomb breadboards, panels, tables and similar structures, herein for brevity referred to as "honeycomb tables."

In practice, honeycomb tables of the type herein disclosed are frequently used with other components and structures, such as in or with vibration isolation systems, as may be seen from the above mentioned Newport Corporation 1983-84 Catalog and from U.S. Pat. No. 3,784,146, by John W. Matthews, Ph.D., issued Jan. 8, 1974 and herewith incorporated by reference herein.

The table leaf 12 is apertured, having a multitude of mutually spaced threaded or tapped mounting holes 13 therethrough, for an attachment of various optical and other components used on the honeycomb table for experimentation, research and development, or for industrial analysis, design and testing or a great variety of other purposes. While only a limited number of apertures 13 are shown in FIG. 1, an actual honeycomb table for optical purposes typically has hundreds or thousands of tapped mounting holes arranged in a regular grid or other two-dimensional pattern in parallel to the length and the width of the table.

In accordance with customary construction, the honeycomb table 10 has a honeycomb core or supporting structure 14 mounting or carrying the apertured table leaf 12 on top thereof. Only part of the honeycomb table is shown in the drawing, as the table itself may be conventional. As seen in FIG. 1 and as indicated by dotted lines in FIG. 2, the honeycomb core 14 has internal cells 16 extending downwardly from the table leaf 12.

In this respect, the expression "honeycomb" as herein employed and as generally used in industry is not restricted to exact hexagonal configurations. Rather, that expression is generally also applied to core configuration composed of corrugated sheets that form cells of other than hexagonal cross-section.

The honeycomb table 10 may be made from an aluminum alloy, from steel or of plastic material, or from a combination thereof, to name a few examples. Conventional adhesives may be employed for attaching the top skin 12 to the celled structure 14.

Various components may be mounted on the optical table 10, such as those disclosed in U.S. Pat. No. 4,120,586, by D. L. Lessner, issued Oct. 17, 1978, and U.S. Pat. No. 4,408,830, by H. A. Wutherich, issued Oct. 11, 1983. Of course, the subject invention is capable of mounting all kinds of other components, herein referred to as "optical components."

Against this background, the illustrated preferred embodiments of the subject invention may be characterized as implementing a method of fixing a base 20 for mounting an object 18 on a plane or curved surface, such as the top surface 112 of the table 10 or leaf 12, having a two-dimensional pattern of mutually spaced mounting holes 13. By way of example, the object being mounted may be an optical component 18, such as a lens or mirror which, in turn, may form part of a holographic or other delicate optical system (not shown).

According to the invention, the mounting base 20, is composed of two complementary base parts 30 and 31 which are made to be rotatable relative to each other. One of these base parts, such as the base part 30, is provided with an eccentric aperture 21 for receiving a bolt or other fastener 22 insertable into any one of the mounting holes 13. In practice, fasteners similar to fasteners 22 may already be present in the mounting holes, and the expression "mounting hole" is intended to be sufficiently broad to cover fastening devices or points arranged in grid or pattern.

ct to one of the bases 20, the other base part 31 may carry or be part of a superstructure 23 for mounting the object or optical component 18.

In the operation of the disclosed mount, the base may be placed on the table 10 or surface 112 and the bolt or fastener 22 may be inserted through the eccentric aperture 21 into one of the mounting holes 13. The base 20 may be shifted relative to that fastener 22 to any one of a multitude of positions about that one mounting hole or bolt. The base may then be attached to the table 10 or surface 112 with the fastener 22 that may comprise a threaded mounting bolt which has a head 25 for that purpose. The head 25, with or without washer, as necessary, reaches onto the solid portions of the base 20 adjacent the eccentric aperture 21.

The base parts are rotated relative to each other as needed for orienting the object 18 above the surface 112. By way of example, the base part 31 and superstructure 23 may be rotated on the base part 30. The illustrated base 20 thus provides three degrees of freedom, comprising the two translational degrees of freedom provided by the base part 30 with inserted fastener 22 and the rotational degree of freedom provided by the base part 31 about an axis normal to the surface 112.

The expression "at least partially eccentric" as herein employed, signifies that at least part of the aperture 21 is spaced from a center 26 of the base 20. Within the scope of the subject invention, the aperture 21 need not go through the center 26. However, the subject invention greatly prefers that the aperture 21 go through the center 26 of the base, since that enables the smallest design in terms of coverage of the surface 112.

In the illustrated preferred embodiment of the invention, the eccentric aperture is provided as an elongate slot 21 into which the bolt 22 is inserted into any one mounting hole 13. The base 20 may then be shifted at that elongate slot 21, relative to the inserted bolt 22, until the base or optical component is in its desired position on the table. The slot 21 may be located symmetrically about the center 26 of the base 20 or base portion 30, but would then still be at least partially eccentric in the sense of having slot portions for accommodating the fastener 22 at locations spaced from the center 26. Also, within the scope of the subject invention, the aperture 21 may be open in the sense of extending through the periphery of the base part 30. However, a laterally closed aperture is presently preferred for increased structural strength of the base.

The eccentric aperture may more specifically be provided as a radial slot 21 into which the bolt 22 is inserted into the desired mounting hole, and the base 20 may then be shifted at that radial slot relative to the inserted bolt.

According to the illustrated preferred embodiment of the invention, the base 20 or base portion 30 is made circular. That circular base or base portion has a center 26, and the otherwise eccentric aperture preferably extends from a peripheral region 28 of the circular base portion 30 to the center 26 thereof. In this manner the base may also be rotated for adjustment about the center 26 without any eccentric motion thereof.

Figure 2:
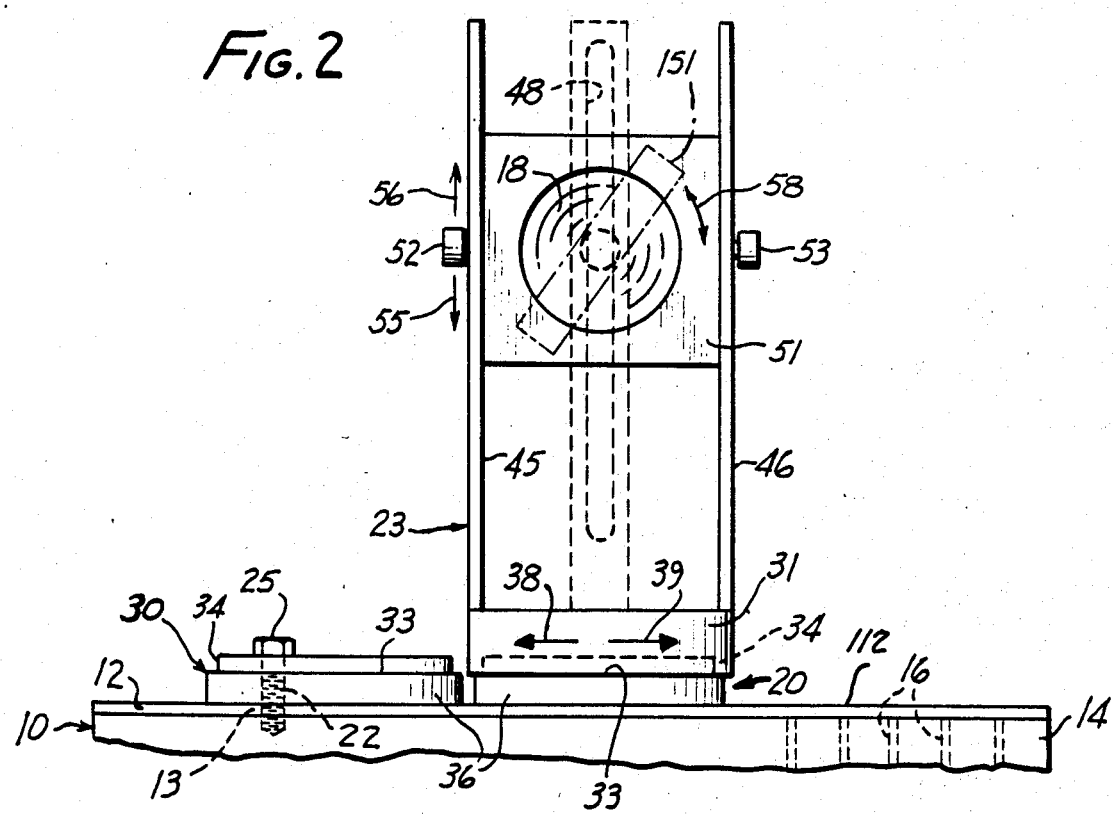
FIG. 2 is a side view of the optical table and mounting structures of FIG. 1, with an elevation of a superstructure according to an embodiment of the subject invention.

According to the embodiment of the invention shown in FIGS. 1 and 2, the superstructure 23 and base part 31 are rendered rotatable on base part 30. Where the base part 30 is circular, the other base part 31 is provided with an annular member corresponding to and being rotatable on the circular base part 30.

According to the illustrated preferred embodiment, the one base part 30 is provided with a stepped periphery having a shoulder 33 encompassing a circular base portion 34. That circular base portion is located on a circular base foundation 36 having a larger diameter than the upper circular base portion 34, and defining the annular shoulder 33 on an upper part thereof. The annular base part 31 of or at the superstructure 23 rests on or engages the shoulder 33 and receives the circular base portion 34 for rotation thereabout. The superstructure 23 and base part 31 may thus be rotated about the base part 30 in the direction of either of the arrows 38 and 39, for an appropriate positioning or orientation of the optical component 18. In general, the base parts 30 and 31 are rotated relative to each other as need for orienting the object 18 above the surface 112.

By virtue of the subject invention, the optical component 18 may be positioned or fixed in any one of an infinite number of positions on the optical table 10 having the two-dimensional pattern of mutually spaced mounting holes 13 for receiving the mounting bolt 22 in any one of these mounting holes.

In particular, the means for positioning the base 20 in any one of a multitude of positions about any one of the mounting holes 13 include means, such as the material of the base, for providing in that base 20 the eccentric aperture, elongate slot or radial slot 21 for loosely receiving the bolt 22 prior to attachment of the base 20 to the table 10 with the bolt 22 in the particular mounting hole 13.

As indicated in FIG. 1 with the aid of dotted outlines 41, the base 20 may be shifted at the eccentric aperture or elongate slot 21 at the received bolt 22. The base 20 may be rotated about bolt, as indicated by the circular phantom outline 42 encompassing an area 43. A dotted circle 44 illustrates the radius of action for all points on the base 20 or object 18 at the particular aperture length and mounting hole.

The two portions 34 and 36 of the base part 30 may be manufactured in one piece or in two pieces. Rather than being circular as shown, the base foundation 36 may be square or of another non-circular configuration, in which case the expression "circular base" as herein employed would refer only to the upper base portion 34 or to circular mating surfaces between parts 30 and 31.

The illustrated superstructure 23 has at least one upright 45 on the annular base part 31 for mounting the optical component 18. Two parallel uprights 45 and 46 are shown in the drawing as rising from the annular base part 31. The uprights are slotted as shown at 48 in FIG. 2 for the case in which the superstructure 23 is rotated by 90° in the direction of either arrow 38 or 39.

The optical component 18 is mounted in or is part of the rectangular frame 51 settable between uprights 45 and 46 with the aid of screws 52 and 53 extending through slots 48 in the uprights 45 and 46. In this manner, the optical component 18 may be adjusted in altitude above the table top 12 in the direction of opposite arrows 55 and 56.

As indicated by double arrow 58 and dotted outline 151, the optical component 18 or frame 51 may also be tilted about the two screws 52-53, in addition to being rotated in the direction of arrows 38 and 39 about an axis normal to the surface 112.

The set bolt 22 may be loosened via its head 25 and the base 20 may then be adjusted along its slot 21. The base 20 may thereafter be set in its adjusted position by tightening the bolt 22. The superstructure 23 may be rotated about the base part 30 and the optical component set in any elevational and angular positions between the uprights 45 and 46. Of course, all kind of superstructures may be provided on each base 20 or base part 30.

A particularly attractive feature of the subject invention is that the bases 20 may be made to be positionable anywhere on the surface 112 with the aid of a two-dimensional pattern or grid of mounting holes 13. Two examples of such universal base positioning are given in FIGS. 3 and 4.

In particular, FIG. 3 shows a fraction of the table 10 or surface 112 wherein the mounting holes 13 are arranged in a grid pattern in which adjacent mounting holes are located on the corners of a unit square 61. The preferred embodiment illustrated in FIG. 3 enables fixing of the base 20 anywhere on the surface 112 by providing the aperture 21 as an elongate aperture having a length at least equal to:

$$L = \frac{A}{\sqrt{2}} \quad (1)$$

wherein:
 L is the length of the elongate aperture 21 by which the base 20 may be shifted relative to the fastener 22; and
 A is a side of the unit square 61.

The base 20 or base part 30 preferably is made circular and the elongate aperture 21 is made to extend for the length, L, defined above, from a center 26 towards a peripheral region of the base 20 or base part 30.

Phantom circles 63 indicate how the center of the base 20 or component 18 may be positioned and repositioned relative to the four mounting holes 13 occupying the corner of the unit square 61. If one considers that the fastener 22 may be inserted in any one of the mounting holes 13, it becomes apparent that the base 31 may be positioned anywhere and in any orientation on the surface 112, even though the mounting holes are mutually spaced from each other.

The bases of the subject invention may thus, for instance, perform the function of magnetic or vacuum bases without, however, having their above mentioned disadvantages.

In addition to enabling fixing of the base 20 anywhere on the surface 112, the subject invention also, enables minimization of the base width by providing the eccentric aperture 21 as an elongate aperture having a length equal to the value L defined above. In other words, the effective length L of aperture 21 is the minimum aperture for maximum coverage of the surface 112. The designer may exceed that minimum aperture length within the scope of the subject invention, but such minimum aperture length actually is an optimum, since it provides for optimum coverage with minimum bulk and material expenditure.

Optimally compact bases and mounting structures may thus be constructed by following the teachings of the subject invention.

Also within the scope of the subject invention, the mounting holes 13 may be arranged in a grid pattern 113 in which adjacent mounting holes are located on the corners of a equilateral triangle 65, as shown in FIG. 4. In that case, a preferred embodiment of the subject invention enables fixing of the base 20 anywhere on the surface 112 by providing the aperture 21 as an elongate aperture having a length at least equal to:

$$L = \frac{B}{\sqrt{3}} \quad (2)$$

wherein:
 L is the length of the elongate aperture 21 by which the base 20 may be shifted relative to the fastener 22; and
 B is a side of the unit triangle 65.

In similarity to the embodiment shown in FIG. 3, the width of the base 20 may be minimized in the embodiment of FIG. 4 by providing the aperture as an elongate aperture 21 having a length equal to the value L as defined above in equation (2).

An indication of attainable coverage may be obtained by dividing the area of the unit cell by the number of mounting holes enclosed by it. In the embodiment of FIG. 3, the resulting quotient is equal to $A^2$, since the unit square 61 encloses four quarter holes, amounting to one mounting hole 13.

On the other hand, the mentioned quotient in the embodiment of FIG. 4 is equal to $$\frac{\sqrt{3}\, B^2}{2} \quad (3)$$

given the area of an equilateral triangle 65 of side B, and the three fractional mounting holes enclosed by that triangle, amounting to one-half mounting hole 13.

If the side B of the triangle 65 in FIG. 4 is equal to the side A of the square 61 in FIG. 3, then the later quotient (3) for the triangle is less than the above mentioned quotient $A^2$ for the unit square.

On the other hand, if the same aperture length L is used for both square and triangular unit cells 61 and 65, then $$B = (\sqrt{3}/\sqrt{2})A \quad (4)$$

The above mentioned quotient (3) then is equal to $$\frac{3\sqrt{3}\,A^2}{4} \quad (5)$$

for the triangle, which is almost 30% higher than for the square pattern.

In practical terms, this means that for a given aperture length, L, less mounting holes 13 are needed to cover a surface area with a grid based on equilateral triangles 65, as opposed to squares 61.

According to a preferred embodiment of the subject invention, the mounting holes 13 are thus preferably arranged in a triangular pattern, such as disclosed above with the aid of FIG. 4.

On the other hand, the square mounting hole distribution shown in FIG. 3 may be rotated by 45°, whereupon the square unit cells 61 come to stand on edge, like diamonds. The resulting above mentioned quotient is then still equal to $A^2$, whereby the latter arrangement is actually equivalent to that shown in FIG. 3.

According to a further aspect thereof, the subject invention also resides in apparatus for mounting an object 18 or 20 on a surface 112 with a fastener 22. According to this aspect of the invention, the mounting apparatus comprises a supporting structure 12 or 110 having the mentioned surface 12, and mounting holes 13 in that supporting structure and surface for receiving the fastener 22. As seen by way of example in FIG. 4, the mounting holes 13 are present in the supporting structure 110 and surface 12 in a two-dimensional pattern 113 in which adjacent mounting holes are located on the corners of an equilateral triangle. One such triangle is shown at 65 in FIG. 4 for three of the mounting holes, but it is to be understood that the other mounting holes 13 are also located on the corners of equilateral triangles or triangular unit cells.

As shown above, the triangular mounting hole patterns herein disclosed have substantial advantages over the traditional grid patterns in which the unit cells are rectangles or squares.

Where the object to be mounted or a base for such object has an elongate aperture of length L, such as the aperture 21 of the base 20, for receiving the fastener 22, the equilateral triangle 65 preferably has a side B equal to $$B = \sqrt{3}\,L \quad (6)$$

In this manner, the object or the base 20 may be fixed anywhere on the surface 12, with the fastener 22 inserted through the aperture 21 into any one of the mounting holes 13 in the triangular two-dimensional pattern 113.

So far, the mounting surface 112 has been considered mostly in terms of a flat mounting surface, such as, for instance, found on an optical table or other mounting structures. However, the universality of the subject invention also extends to the fact that the mounting or supporting surface may be plane or curved.

Figure 5:
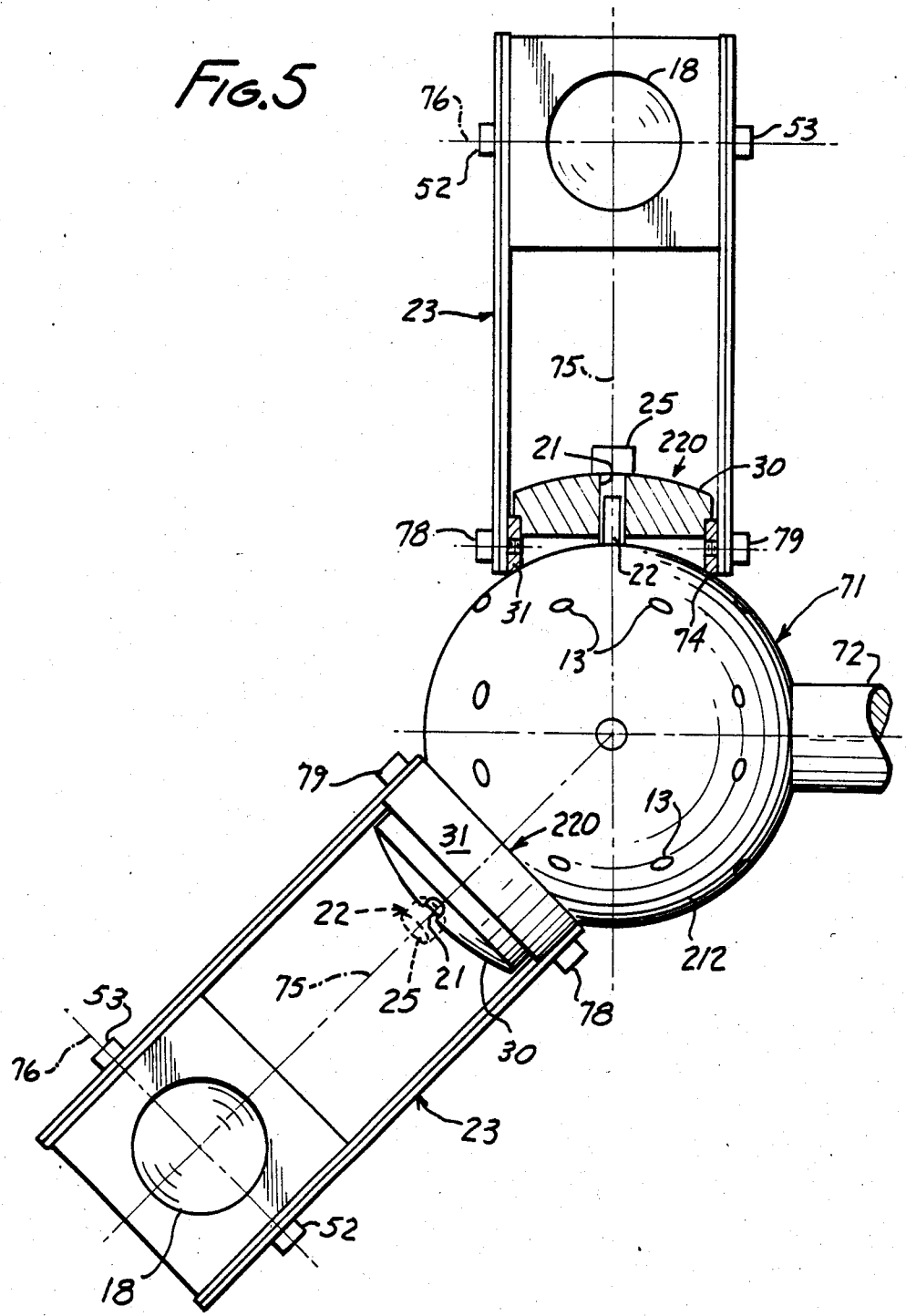
FIG. 5 is an elevation of a mounting system according to a further embodiment of the subject invention.

By way of further example, FIG. 5 shows a curved surface 212 for mounting bases 220 with the aid of mounting holes 13.

As shown in FIG. 5, the curved surface 212 may, for instance, be the surface of a supporting sphere 71 sitting on top of a mounting rod 72. In practice, the mounting rod 72, in turn, may be mounted on an optical table, such as with the aid of one of the above mentioned bases 20, in which the base part 31 may carry the mounting rod 72.

Like the bases 20, the bases 220 have an elongate aperture or slot 21 for receiving a fastener inserted through that slot into any one of the mounting holes 13. In further similarity to the bases 20, each base 220 is composed of two complementary base parts 30 and 31 rotatable relative to each other. One of these base parts, such as the part 30, again has an at least partially eccentric aperture 21 for loosely receiving the fastener 22 prior to attachment of the base to the surface 212 with the fastener in the particular mounting hole 13. The base apertures 21 shown in FIG. 5 may in practice have any of the forms and dimensions disclosed above with respect to FIGS. 1 to 4, and the mounting holes may in FIG. 5 also be in one of the square or triangular patterns shown in FIGS. 3 and 4, for instance, such that each base 220 may be located anywhere on the spherical surface 212, except for the location of the mounting rod 72.

As shown in FIG. 5, what has been termed above as the other of the two base parts may be fixed on the surface 212 by positioning such other base part 31 between the above mentioned one base part 30 and the surface 212, and by tightening the fastener 22 onto that one base part, such as by means of the head 25. In this manner, both base parts 30 and 31 are securely clamped down on the surface 212 with one and the same bolt or fastener 22. The superstructure 23, which carries the object 18 to be mounted, is thus secured relative to the support 71 or surface 212 by one and the same fastener 22.

Within the scope of the subject invention, the same principle may be employed for attaching both base parts 30 and 31 and superstructure 23 simultaneously to the surface 12 or table 10 with one fastener 22, such as in the embodiments of FIGS. 1 to 4.

In either case, the other base part 31 is adapted to be located between the one base part 30 and the surface 12 or 212 when the base 20 or 220 is located on that surface. As shown at 74 in FIG. 5, such adaptation may involve an annular or spherical flattening of an edge of the other base part or annular member 31. Prior to the tightening of the fastener in the embodiment of FIG. 5, each superstructure 23 may be rotated about an axis 75 normal to the surface 212 or sphere 71, until the object 18 has been oriented as desired, upon which the corresponding fastener 22 may be tightened to clamp the base parts onto the sphere 71. Further angular adjustment of the object 18 may be effected about an axis 76 extending through fasteners 52 and 53.

In addition, as indicated by way of example in FIG. 5, further tightenable fasteners 78 and 79 may be provided in the base portion 31 at the foot of the superstructure 23 to permit further angular or swinging motion of the superstructure relative to the base 220.

Squares equilateral triangles are subsets of four and three sided shapes, respectively. For any arbitrary shape which can be used as a unit cell in a periodic grid, one may pursuant to the invention herein disclosed, design a base with the appropriate aperture length for positioning of that base anywhere and in any orientation on the surface having that periodic grid.

The subject invention is not limited to use with structures in which fasteners 22 are inserted through any slot 21 into a mounting hole 13. Rather, the invention may also be practiced with granite tables and other structures in which fasteners are already located in holes or project from a surface. In either case, one of the fasteners is extended through the aperture 21 of the base at one of the mounting holes 13, such as the mounting hole into which the fastener 22 is inserted through the slot 21, or a mounting hole in which a bolt or fastener is already located, to be extended through the aperture 21, such as when the base is placed with its aperture over the previously positioned bolt or fastener.

The utility of the subject invention is not limited to optics, but extends to the machine tool and other industries, where objects are to be positioned as herein disclosed.

The concepts of the subject invention can be implemented by bases in which a disk similar to part 30 or 220 is retained by a C-type spring or otherwise in a block that is located on the table 10 or supporting surface 112. That base block may, for instance, be square or rectangular, with or without an apertured V-shaped or other extension for locating and mounting purposes.

Such mounting bases may also be used as position reference blocks for applications where components must be removed and reinserted into setups without disturbing alignments. For this and other purposes, the base blocks may be provided with lateral locating spheres along edges thereof, to serve as indexing points.

In practice, bases according to the subject invention can also be used to mount a platform that can be positioned anywhere and in any orientation on a table 10 or surface 112. That mounting platform, in turn, may be provided with threaded or other mounting holes for other components positioned typically on top thereof.

If the base block is square or rectangular as mentioned above, then a similarly square or rectangular platform can be releasably mounted on top thereof. The disk 30 or 220 with slot 21 can then rotatably be retained in a corresponding circular hole in the base block, and access to the fastening bolt 22 or head 25 is obtained by temporary removal of the platform from the base block and rotatable disk assembly.

Further variations and modifications within the spirit and scope of the subject invention will suggest themselves or become apparent to those skilled in the art from the present extensive disclosure.

I claim:

1. In a method of fixing a base for mounting an object on a surface having a two-dimensional pattern of mutually spaced mounting holes for fasteners, the improvement comprising in combination the steps of:
providing said base with two complementary base parts rotatable relative to each other;
providing one of said base parts with an at least partially eccentric aperture for receiving any one of said fasteners at any one of said mounting holes;
placing said base on said surface;
extending one of said fasteners through said aperture at one of said mounting holes;
shifting said base relative to said one of said fasteners at any one of a multitude of positions about said one mounting hole; and
attaching said base to said surface with said one of said fasteners;
said object being mounted on the other of said base parts, and said base parts being rotated relative to each other as needed for orienting said object above said surface.

2. A method as claimed in claim 1, wherein:
said aperture is provided as an elongate slot into which said one of said fasteners is inserted into said one mounting hole; and
said shifting includes shifting said one base part at said elongate slot relative to said one of said fasteners.

3. A method as claimed in claim 1, wherein:
said aperture is provided as a radial slot into which said one of said fasteners is inserted into said one mounting hole; and
said shifting includes shifting said one base part at said radial slot relative to said one of said fasteners.

4. A method as claimed in claim 3, wherein:
said one base part is made circular.

5. A method as claimed in claim 1, wherein:
said one base part is made circular.

6. A method as claimed in claim 5, wherein:
said circular base part has a center to which said aperture extends from a peripheral region of said circular base part.

7. A method as claimed in claim 1, including the step of:
fixing the other of said two base parts on said surface by positioning said other base part between said one base part and said surface and by tightening said one of said fasteners onto said one base part.

8. A method as claimed in claim 1, including the steps of:
making said one base part circular; and
providing the other of said two base parts with an annular member corresponding to and rotatable on said circular base part.

9. A method as claimed in claim 1, including the steps of:
providing said one base part with a stepped periphery having a shoulder encompassing a circular base portion; and
providing the other of said two base parts with an annular member engaging said shoulder and receiving said circular base portion for rotation thereabout.

10. A method as claimed in claim 1, including the steps of:
arranging said mounting holes in a grid pattern in which adjacent mounting holes are located on the corners of a square; and
enabling fixing of said base anywhere on said surface by providing said aperture as an elongate aperture having a length at least equal to:

$$L = \frac{A}{\sqrt{2}}$$

wherein:
L is the length of the elongate aperture by which said base may be shifted relative to said one of siad fasteners; and
A is a side of said square.

11. A method as claimed in claim 10, wherein:
said one base part is made circular; and
said elongate aperture is made to extend for said length L from a center toward a peripheral region of said circular base part.

12. A method as claimed in claim 1, including the steps of:
arranging said mounting holes in a grid pattern in which adjacent mounting holes are located on the corners of a square; and
enabling fixing of said base anywhere on said surface and minimization of said base in width by providing said aperture as an elongate aperture having a length equal to:

$$L = \frac{A}{\sqrt{2}}$$

wherein:
L is the length of the elongate aperture by which said base may be shifted relative to said fastener; and
A is a side of said square.

13. A method as claimed in claim 1, including the steps of:
arranging said mounting holes in a two-dimensional pattern in which adjacent mounting holes are located on the corners of an equilateral triangle; and
enabling fixing of said base anywhere on said surface by providing said aperture as an elongate aperture having a length at least equal to:

$$L = \frac{B}{\sqrt{3}}$$

wherein:
L is the length of the elongate aperture by which said base may be shifted relative to said one of said fasteners; and
B is a side of said triangle.

14. A method as claimed in claim 13, wherein:
said one base part is made circular; and
said elongate aperture is made to extend for said length L from a center toward a peripheral region of said circular base part.

15. A method as claimed in claim 1, including the steps of:
arranging said mounting holes in a two-dimensional pattern in which adjacent mounting holes are located on the corners of an equilateral triangle; and
enabling fixing of said base anywhere on said surface and minimization of said base in width by providing said aperture as an elongate aperture having a length equal to:

$$L = \frac{B}{\sqrt{3}}$$

wherein:
L is the length of the elongate aperture by which said base may be shifted relative to said one of said fasteners; and
B is a side of said triangle.

16. In apparatus for fixing a base for mounting an object on a surface having a two-dimensional pattern of mutually spaced mounting holes for receiving a fastener in any one of said mounting holes, the improvement comprising in combination:
two complementary base parts in said base rotatable relative to each other, one of said base parts having an at least partially eccentric aperture for loosely receiving said fastener prior to attachment of said base to said surface with said fastener in one of said mounting holes; and
means for mounting said object on the other of said base parts.

17. Apparatus as claimed in claim 16, wherein:
said aperture is an elongate slot for receiving said fastener.

18. Apparatus as claimed in claim 16, wherein:
said aperture is a radial slot for loosely receiving said fastener prior to said attachment.

19. Apparatus as claimed in claim 18, wherein:
said base is circular.

20. Apparatus as claimed in claim 16, wherein:
said base is circular.

21. Apparatus as claimed in claim 16, wherein:
said means for mounting said object include a superstructure integral with said other base part and rotatable therewith relative to said one base part.

22. Apparatus as claimed in claim 21, wherein:
said superstructure has an upright on said other base part for mounting said object.

23. Apparatus as claimed in claim 16, wherein:
said one base part is circular; and
said aperture extends from a center to a peripheral region of said circular base part.

24. Apparatus as claimed in claim 16, wherein:
said other base part is adapted to be located between said one base part and said surface when said base is located on said surface.

25. Apparatus as claimed in claim 16, wherein:
said one base part is circular; and
said other base part has an annular member corresponding to and rotatable on said circular base part.

26. Apparatus as claimed in claim 16, wherein:
said one base part has a stepped periphery including a shoulder encompassing a circular base portion; and
said other base part has an annular member engaging said shoulder and receiving said circular base portion for rotation thereabout.

27. Apparatus as claimed in claim 26, wherein:
said circular base portion has a center to which said eccentric aperture extends from a peripheral region of said circular base portion.

28. Apparatus as claimed in claim 16, wherein:
said mounting holes are in a grid pattern in which adjacent mounting holes are located on the corners of a square; and
said aperture is an elongate aperture having a length at least equal to:

$$L = \frac{A}{\sqrt{2}}$$

wherein:
L is the length of the elongate aperture by which said base may be shifted relative to said fastener; and
A is a side of said square;
whereby said base may be fixed anywhere on said surface.

29. Apparatus as claimed in claim 28, wherein:

said one base part is circular; and said elongate aperture extends for said length L from a center toward a peripheral region of said circular base part.

30. Apparatus as claimed in claim 16, wherein:

said mounting holes are in a grid pattern in which adjacent mounting holes are located on the corners of a square; and said aperture is an elongate aperture having a length equal to:

$$L = \frac{A}{\sqrt{2}}$$

wherein:

L is the length of the elongate aperture by which said base may be shifted relative to said fastener; and A is a side of said square;

whereby said base may be fixed anywhere on said surface and may be minimized in width.

31. Apparatus as claimed in claim 16, where:

said mounting holes are in a two-dimensional pattern in which adjacent mounting holes are located on the corners of an equilateral triangle; and said aperture is an elongate aperture having a length at least equal to:

$$L = \frac{B}{\sqrt{3}}$$

wherein:

L is the length of the elongate aperture by which said base may be shifted relative to said fastener; and B is a side of said triangle;

wherein said base may be fixed anywhere on said surface.

32. Apparatus as claimed in claim 31, wherein:

said one base part is circular; and said elongate aperture extends for said length L from a center toward a peripheral region of said circular base part.

33. Apparatus as claimed in claim 16, wherein:

said mounting holes are in a two-dimensional pattern in which adjacent mounting holes are located on the corners of an equilateral triangle; and said aperture is an elongate aperture having a length equal to:

$$L = \frac{B}{\sqrt{3}}$$

wherein:

L is the length of the elongate aperture by which said base may be shifted relative to said fastener; and B is a side of said triangle;

whereby said base may be fixed anywhere on said surface and may be minimized in width.

* * * * *